(12) United States Patent
Clark et al.

(10) Patent No.: US 9,635,909 B2
(45) Date of Patent: May 2, 2017

(54) BUCKLE RELEASE MECHANISM

(71) Applicant: Carleton Life Support Systems, Inc., Davenport, IA (US)

(72) Inventors: Robert E. Clark, Seminole, FL (US); Shawn Roemer, St. Petersburg, FL (US); Nicholas W. Pandelos, Clearwater, FL (US); Brian Ford, Bettendorf, IA (US); Timothy Raleigh, Long Grove, IA (US); Lyle Berkenbosch, Bettendorf, IA (US); Ivan Gonzales, Davenport, IA (US)

(73) Assignee: Carleton Life Support Systems Inc., Davenport, IA (US)

( * ) Notice: Subject to any disclaimer, the term of this patent is extended or adjusted under 35 U.S.C. 154(b) by 0 days.

(21) Appl. No.: 14/736,820

(22) Filed: Jun. 11, 2015

(65) Prior Publication Data

US 2015/0272282 A1    Oct. 1, 2015

Related U.S. Application Data

(63) Continuation-in-part of application No. 14/014,481, filed on Aug. 30, 2013, now abandoned.

(60) Provisional application No. 61/695,448, filed on Aug. 31, 2012.

(51) Int. Cl.
*A44B 11/25* (2006.01)
*B64D 17/32* (2006.01)

(52) U.S. Cl.
CPC .......... *A44B 11/2526* (2013.01); *B64D 17/32* (2013.01); *Y10T 24/45602* (2015.01); *Y10T 24/45628* (2015.01); *Y10T 24/45634* (2015.01); *Y10T 24/45665* (2015.01)

(58) Field of Classification Search
CPC ............ A44B 11/2526; A44B 11/2546; A44B 11/2507; Y10T 24/45602; Y10T 24/45634; Y10T 24/45665
See application file for complete search history.

(56) References Cited

U.S. PATENT DOCUMENTS

| | | | |
|---|---|---|---|
| 3,986,234 A | 10/1976 | Frost et al. | |
| 6,205,628 B1 | 3/2001 | Downie | |
| 2002/0178557 A1 | 12/2002 | Katsuyama | |
| 2007/0143973 A1 | 6/2007 | Forster | |
| 2012/0110800 A1 | 5/2012 | Novara | |

*Primary Examiner* — Robert J Sandy
*Assistant Examiner* — Michael Lee
(74) *Attorney, Agent, or Firm* — Woods Oviatt Gilman LLP; Katherine H. McGuire, Esq.

(57) ABSTRACT

A buckle release mechanism can be used to couple together various types of straps, webbing or belts. In one particular embodiment, the release mechanism forms part of a parachute canopy for a pilot's harness. The mechanism includes a housing with a locking mechanism. The locking mechanism employs two rotatable locking pins with associated cams and openings. An opening is formed within the housing for receiving a yoke. A striker plate with opposing lugs is formed at one end of the yoke. The lugs cooperate with the locking pins to either retain or eject the striker plate within the housing.

17 Claims, 12 Drawing Sheets

BUCKLE RELEASE MECHANISM

CROSS-REFERENCE TO RELATED APPLICATIONS

This application is a continuation-in-part of pending U.S. patent application Ser. No. 14/014,481 filed Aug. 30, 2013, and entitled "Buckle Release Mechanism," which itself claims priority to provisional application Ser. No. 61/695,448 filed on Aug. 31, 2012, and entitled "Buckle Release Mechanism," the contents of which are fully incorporated herein.

TECHNICAL FIELD

The present invention relates to a buckle, more particularly, the present invention relates to a buckle release mechanism that permits the buckle to be released while under a load.

BACKGROUND OF THE INVENTION

Buckles and buckle release systems are frequently used to secure harnesses, safety restraints, and parachutes. Parachute harnesses, for example, include a buckle having a buckle release system for releasing the harness from the canopy of the parachute. Several different buckle release systems are known in the art.

U.S. Pat. No. 3,986,234 to Frost et al, discloses a releasable fastener for securing together two straps. A link is included for attachment to one of the straps. The link takes the form of a plate-like strike with a pair of spaced-apart locking lugs that define locking notches. The lugs cooperate with a pair of spaced-apart locking pins. Bifurcated levers secured to the upper ends of the locking pins serve to rotate the locking-pins in response to the movement of a slide. A pivotal latch is also included. The latch must be pivoted prior to moving the slide.

The buckle of Frost may suffer from the drawback that a large amount of force is needed in order to move the slide and release the parachute riser straps. The force required to move the slide dramatically increases to the extent that one or more of the straps is under tension, as may be the case when a parachute is deployed. The level of force required to move the slide may preclude a user from releasing the mechanism or may preclude the user from releasing the mechanism with one hand.

A further buckle release design is disclosed in U.S. Pat. No. 5,857,247 to Warrick et al. Warrick discloses a buckle release system for the manual or automatic release of a crewmember harness. This buckle has a frame that receives a cooperating tang that is secured to a portion of the harness. A tang assembly secures the buckling member in the frame. A latch that pivots between a closed position and an open position holds the tang assembly. The latch is intended to prevent the inadvertent release of the buckling member from the frame. A lever that includes a cavity holds a free end of the latch. During operation, the lever is moved to an open position in order to release the latch.

However, like other buckles, the buckle disclosed in Warrick may not open and release the harness under some difficult or extreme conditions. Failure of the buckle to open and release can be hazardous to the wearer of the harness. For example, a parachute canopy may exert a substantial force on the harness when the conditions are windy and/or when the canopy is being dragged through water. If the buckle fails to release when needed, or if the wearer is otherwise unable to activate the release, the aircraft personnel could be dragged along the ground or through water due to the force on the canopy. This could place the wearer in great danger of receiving significant bodily injury.

An additional buckle release system is disclosed in U.S. Pat. No. 6,763,557 to Clark et al., the contents of which are fully incorporated herein by reference. Clark discloses a buckle release system for releasing a parachute canopy from a harness. The buckle includes both a lock lever, a manual release lever, a spring biased catch and a latch positioned in a frame. A slide member is provided that operates to hold the latch in a locked position and prevents a buckling member from being released when the buckle is in a locked position. The lock lever is provided to prevent the unintended release of the manual release lever and thus a premature release of the parachute canopy from a harness.

However, the lock lever of Clark often encounters significant aerodynamic and inertial forces both before and after parachute deployment. On some occasions, these forces may cause the premature release of the lock lever. Although such an event would not, in and of itself, cause the premature release of the parachute canopy, it does reduce the available safety factor. Namely, if both the lock lever and the release lever were prematurely opened, the result could be a premature release of the canopy.

Accordingly, a need exists for a buckle with a buckle release system that can withstand and operate under difficult operating environments. There also exists a need for a buckle release system that is not prone to premature or accidental release and that can be released while under load.

SUMMARY OF THE INVENTION

An advantage of the present disclosure is realized by providing a buckle retaining mechanism that keeps an associated tang securely locked in difficult operating environments.

A further advantage of the present disclosure is achieved by providing a retaining mechanism that prevents the accidental or unintended release of the buckle.

Another possible advantage is attained by including a failsafe mechanism within the buckle release.

Still yet another possible advantage is achieved by reducing the force needed to release the disclosed buckle.

A further advantage is realized by providing a buckle release mechanism that can be released by the user while the release is under a load.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

The present invention relates to a buckle and a buckle release mechanism. The buckle includes a housing with a locking mechanism. The locking mechanism employs two rotatable locking pins with associated cams and openings. An opening is formed within the housing for receiving a yoke. A striker plate with opposing lugs is formed at one end of the yoke. The lugs cooperate with the locking pins to either retain or eject the striker plate within the housing.

Figure 5:
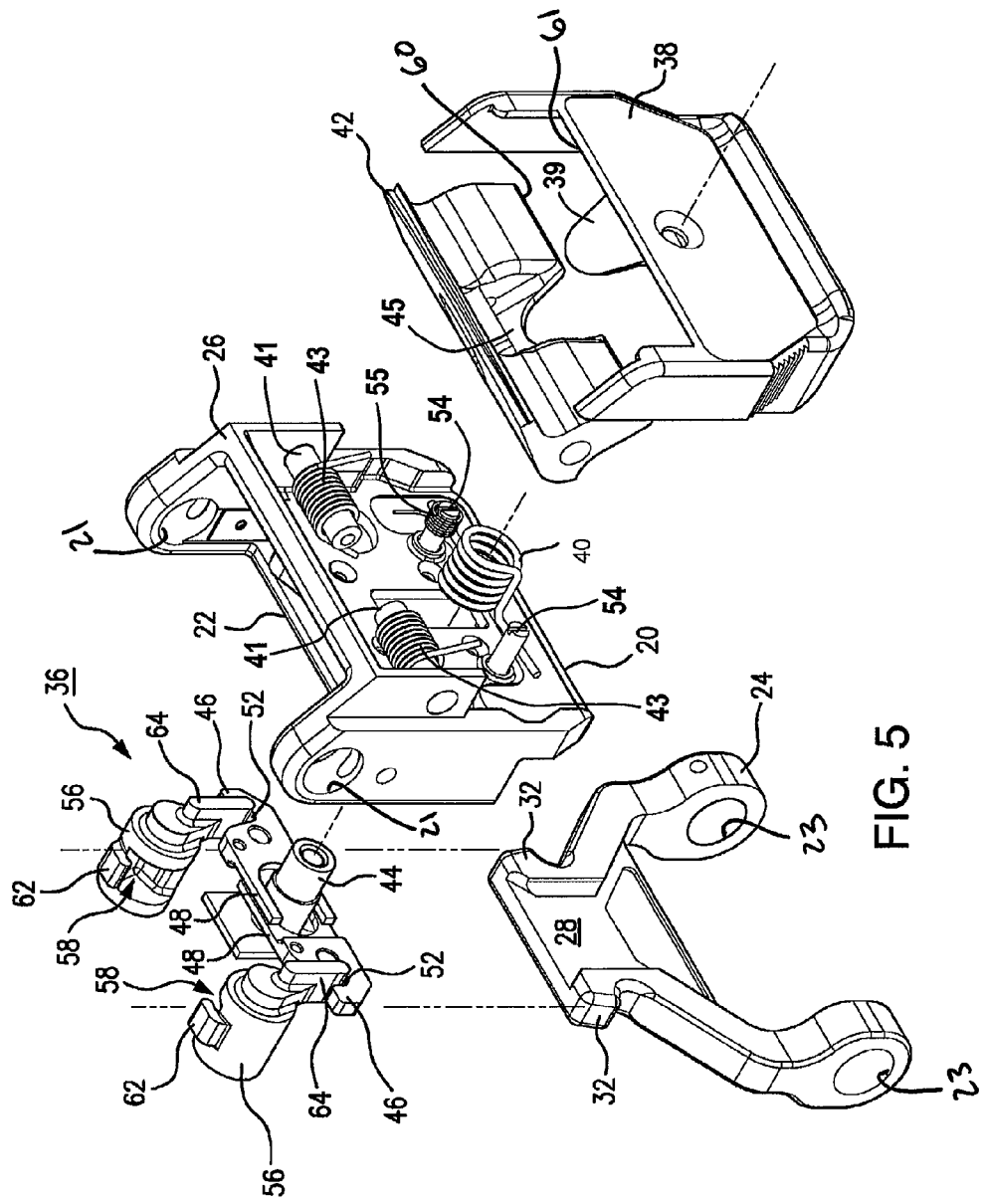
FIG. 5 is an exploded view of the buckle release mechanism shown in FIG. 1.

The buckle 10 includes opposing forward 20 and rearward 22 ends for coupling various types of straps, webbing or belts. In one particular embodiment, buckle 10 forms part of a parachute canopy for a pilot's harness. To achieve this, each end 20, 22 of the buckle is adapted to receive a roller (not shown) between opposing apertures 21, 23, respectively, defined within their respective ends. Each length of webbing has an end that is secured about one of these rollers. The forward roller extends between two ends of a removable yoke 24. The rearward roller extends between two sides of a housing 26. Each roller can be secured to the end of a length of a webbing. A striker plate 28 with opposing lugs 32 is formed at the opposite end of yoke 24 (FIG. 5). Striker plate 28 and lugs 32 are adapted to be inserted into an aperture 34 at forward end 20 of housing 26.

Striker plate 28 is retained in (or ejected from) housing 26 by way of a locking mechanism 36. Locking mechanism 36 is described next in conjunction with FIGS. 4 and 5. Locking mechanism 36 can be operated by the user via a slide 38 and latch 42. Slide 38 includes downwardly extending sides that are mounted over the sides of housing 26. This interconnects slide 38 to housing 26 and it also allows slide 38 to be slid between the forward and rearward ends (20 and 22, respectively) of housing 26. Slide 38 is prevented from moving towards the rearward end 22 of housing 26 by latch 42 through the interference between latch edge 60 and slide edge 61 of slide 38. Latch 42 further includes a slide tongue 39 that resides within a notched portion 45 defined by latch 42 to prevent contaminants from entering the locking mechanism 36.

Latch 42 is pivotally coupled to housing 26 via latch pins 41 and has opened and closed positions. When latch 42 is pivoted upwardly in the direction generally indicated by arrow 47 (see FIG. 7), the bottom of the latch 42 rotates downwardly in the direction generally indicated by arrow 65. This action disengages latch edge 60 from slide edge 61, which in turn permits slide 38 to be moved rearwardly to the rearward end 22 of housing. Latch 42 is normally biased to the closed position (note FIG. 7) via a latch spring 43, thereby preventing the rearward movement of slide 38. Latch 42 can be pivoted to an opened position by overcoming the spring bias. This two part actuation (i.e., pivoting latch 42 upwardly and moving slide 38 rearwardly) avoids inadvertent release of the mechanism.

Figure 7:
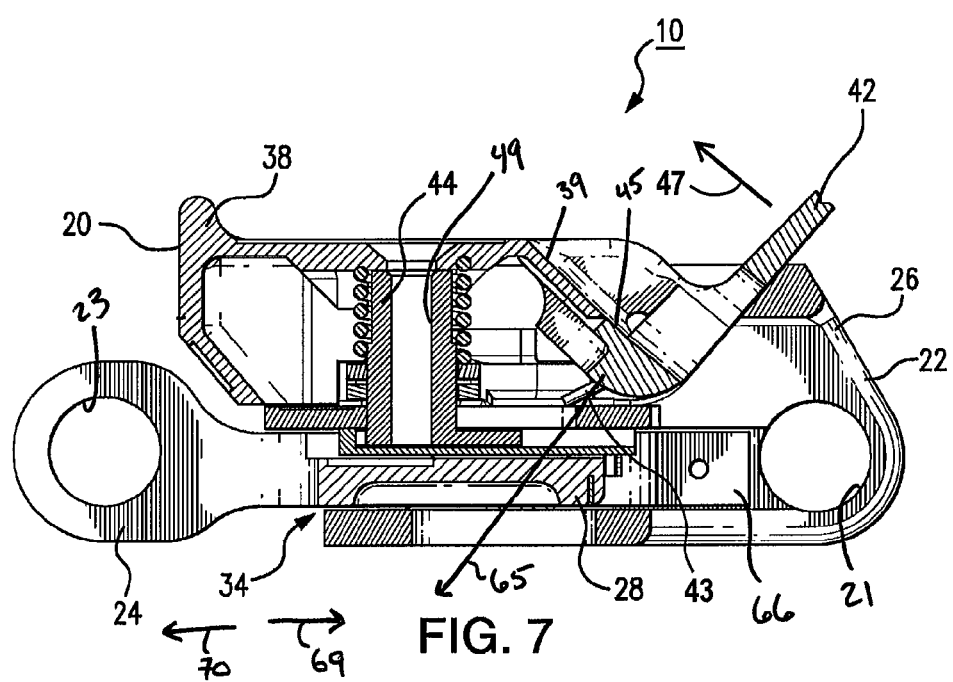
FIG. 7 is a side sectional view of the locking mechanism shown in FIG. 6A.
Figure 8:
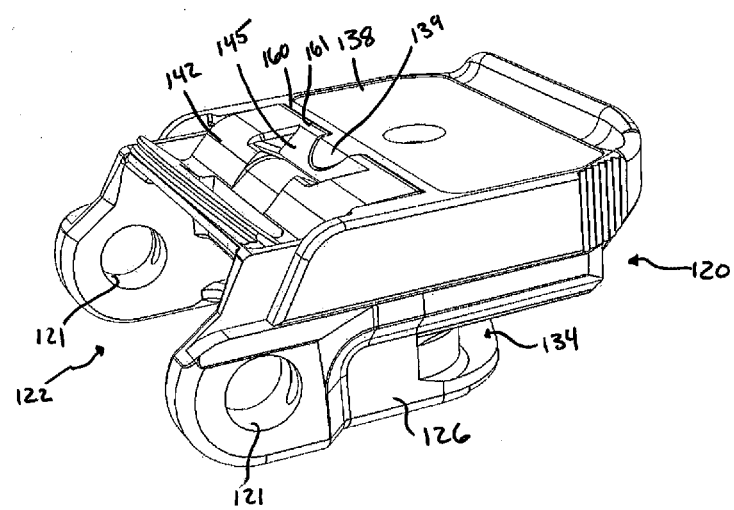
FIG. 8 is a perspective top view of a housing of a further embodiment of a buckle release mechanism in accordance with the present invention.

Locking mechanism 36 includes a central slide post 44 that extends through housing 26 and is coupled to slide 38 (such as, by example, a screw threaded within hole 49 shown in FIG. 7). Slide post 44 also interconnects a pair of locking levers 46. Each of the locking levers 46 includes an inner end 48 that is forked. The forked extent 48 of each locking lever 46 is positioned about slide post 44. The outer extent of each locking lever 46 defines a recess 52. Movement of slide 38 with respect to housing 26 causes a corresponding movement of slide post 44 with respect to housing 26. Movement of slide post 44, in turn, causes each of the locking levers 46 to pivot about a respective pivot point 54. A post spring 40 may be positioned about slide post 44 to urge it into a locked position (note FIG. 4A). When slide post 44 is positioned as noted in FIG. 4A, locking levers 46 are in alignment with one another. This corresponds to the locked orientation. When slide post 44 is positioned as noted in FIG. 4B, locking levers 46 are angled with respect to one another. This corresponds to the unlocked orientation.

As shown most clearly in FIG. 7, buckle 10 may further include a leaf spring 66 that may be configured to become compressed to a loaded position as striker 28 is inserted into housing 26 as a user applies a locking force in the direction generally indicated by numeral 69. Once striker 28/yoke 24 is inserted into aperture 34 and locked in place by locking levers 46 (as will be discussed in more detail below), the compressed leaf spring 66 is biased to store an unlocking force which seeks to bias movement of striker 28 in the opposing direction 70. The unlocking force is transmitted through striker 28 and is prevented from releasing due to the locking engagement of lugs 32 within cam openings 58 of locking pins 56 as described below.

Figure 1:
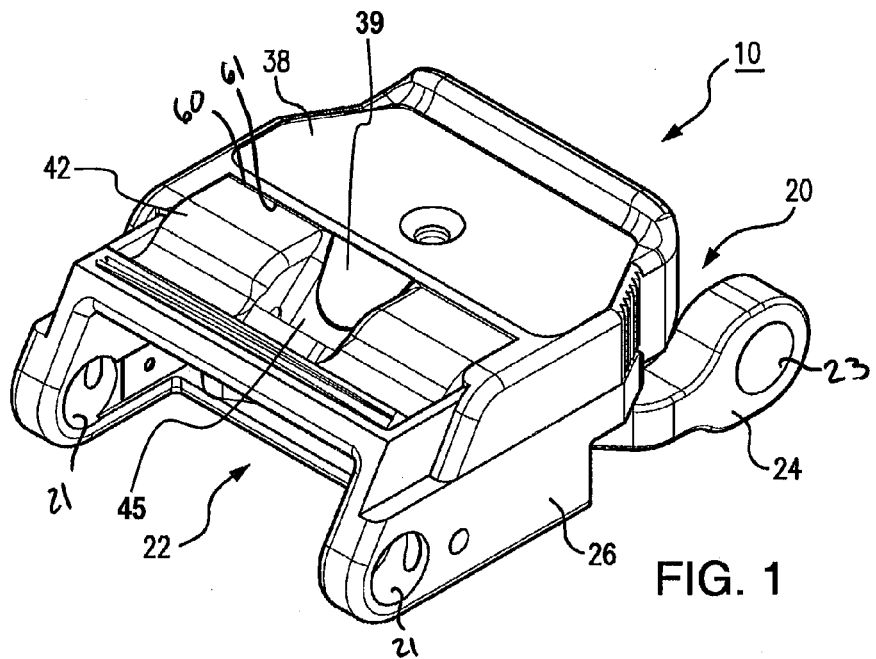
FIG. 1 is a perspective top view of a first embodiment of a buckle release mechanism in accordance with the present invention.
Figure 2:
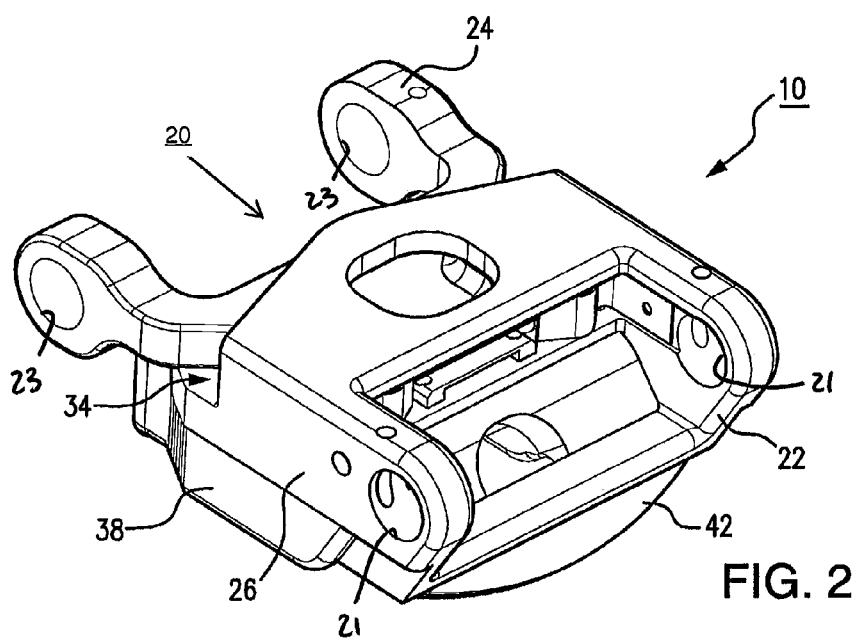
FIG. 2 is a perspective bottom view of the buckle release mechanism shown in FIG. 1.
Figure 3:
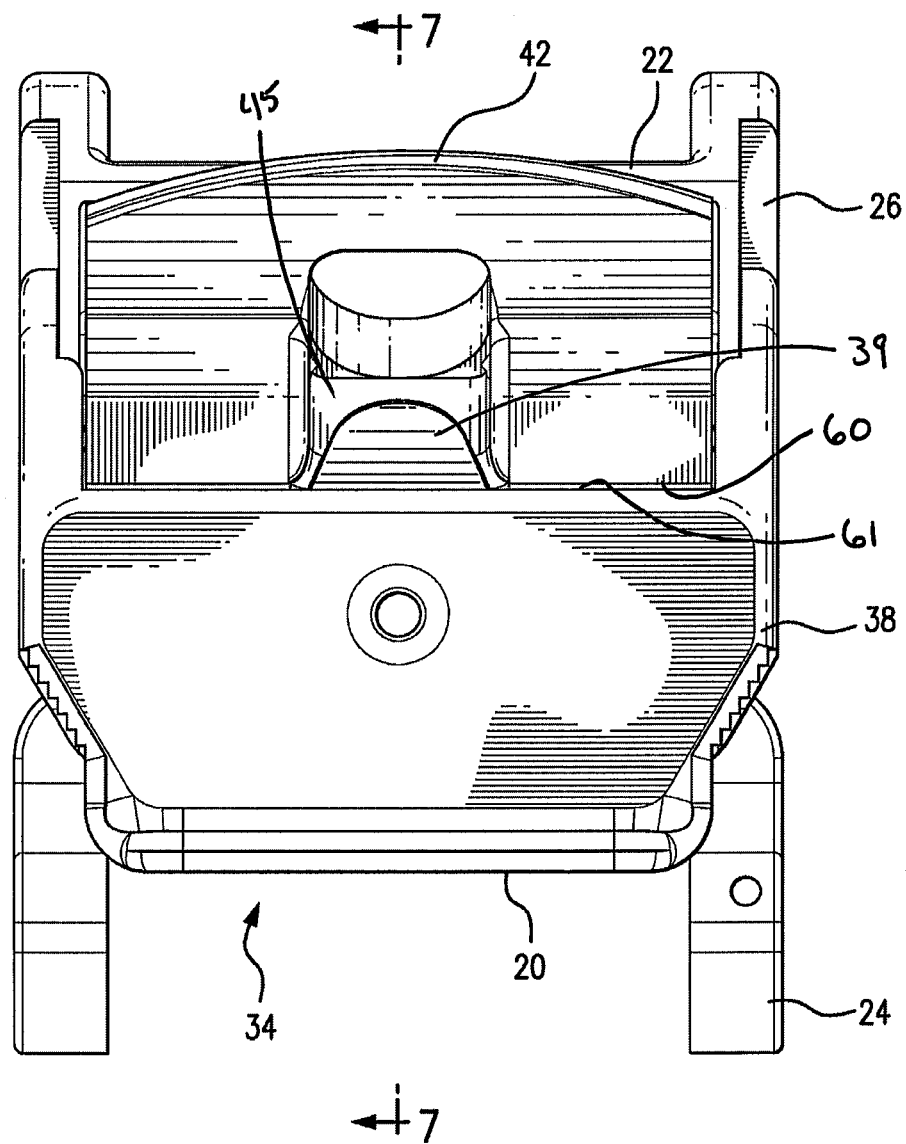
FIG. 3 is a top plan view of the buckle release shown in FIG. 1.
Figure 4A:
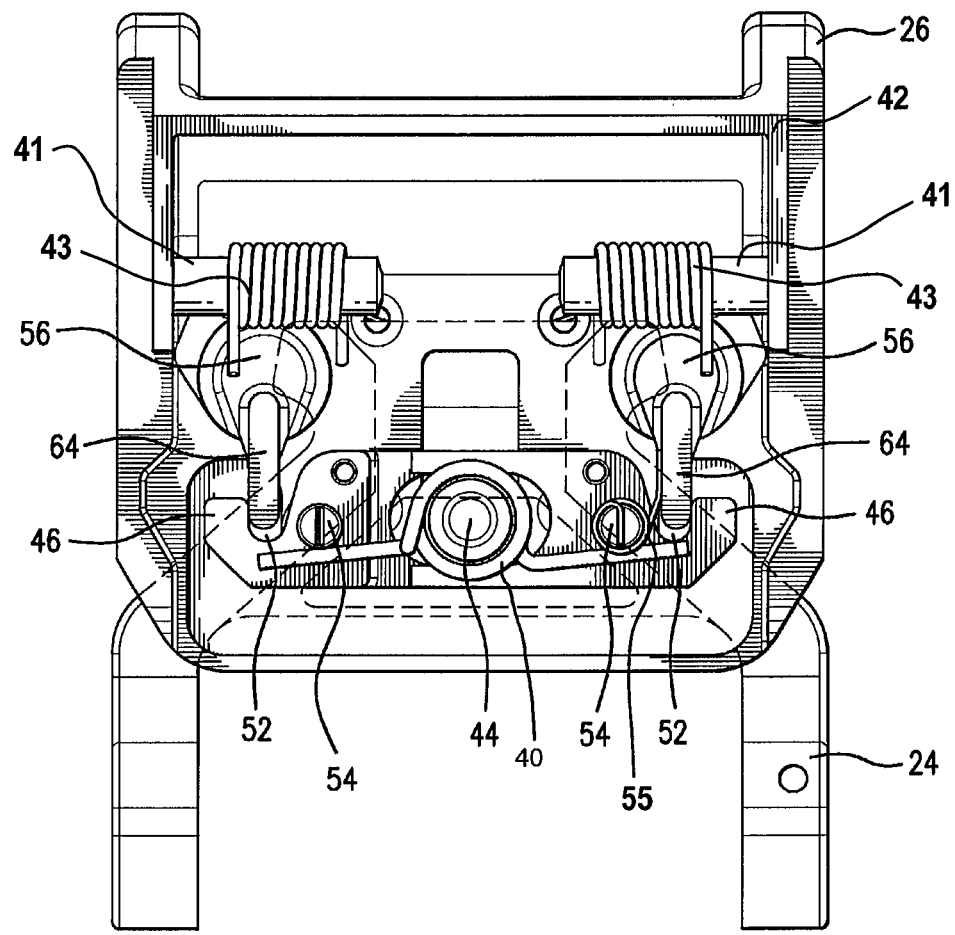
FIG. 4A is a top plan sectional view of the buckle release shown in FIG. 1 in the locked orientation.
Figure 4B:
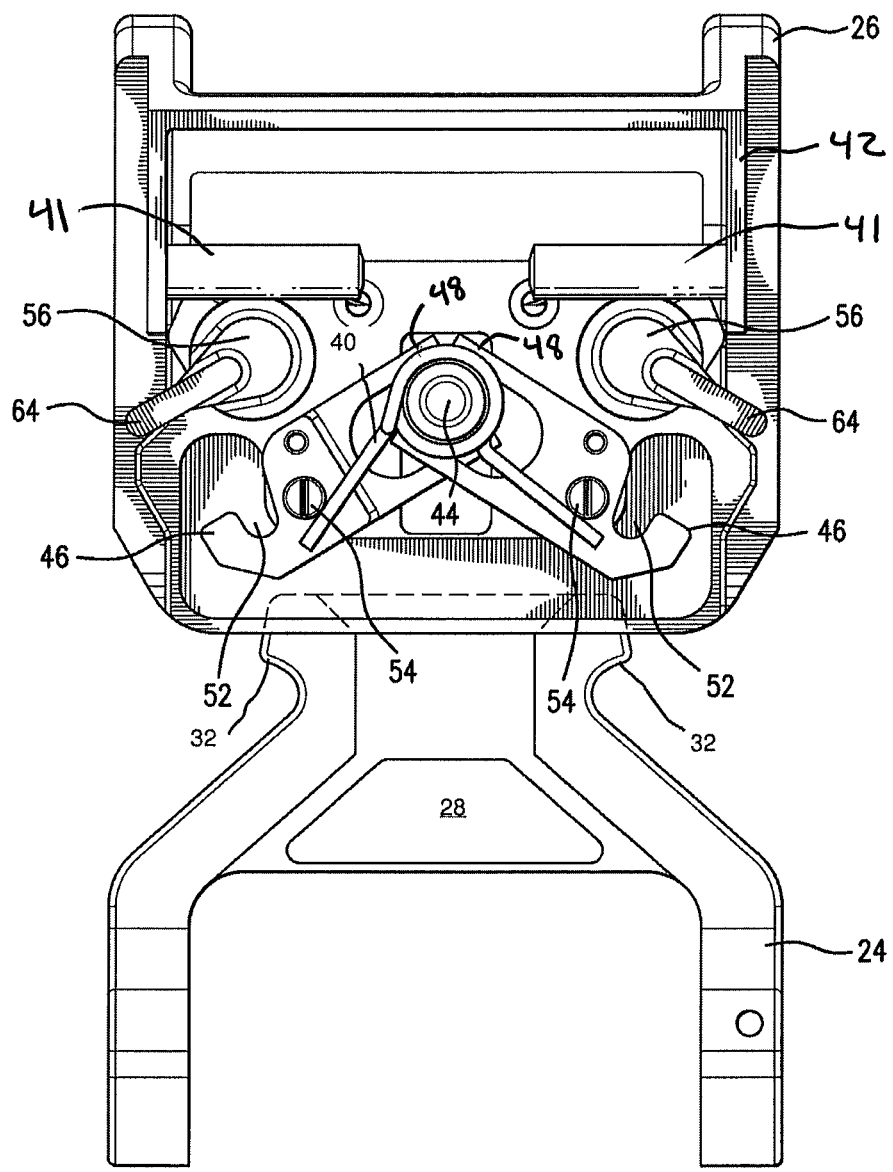
FIG. 4B is a top plan sectional view of the buckle release shown in FIG. 1 in the unlocked orientation.
Figure 6:
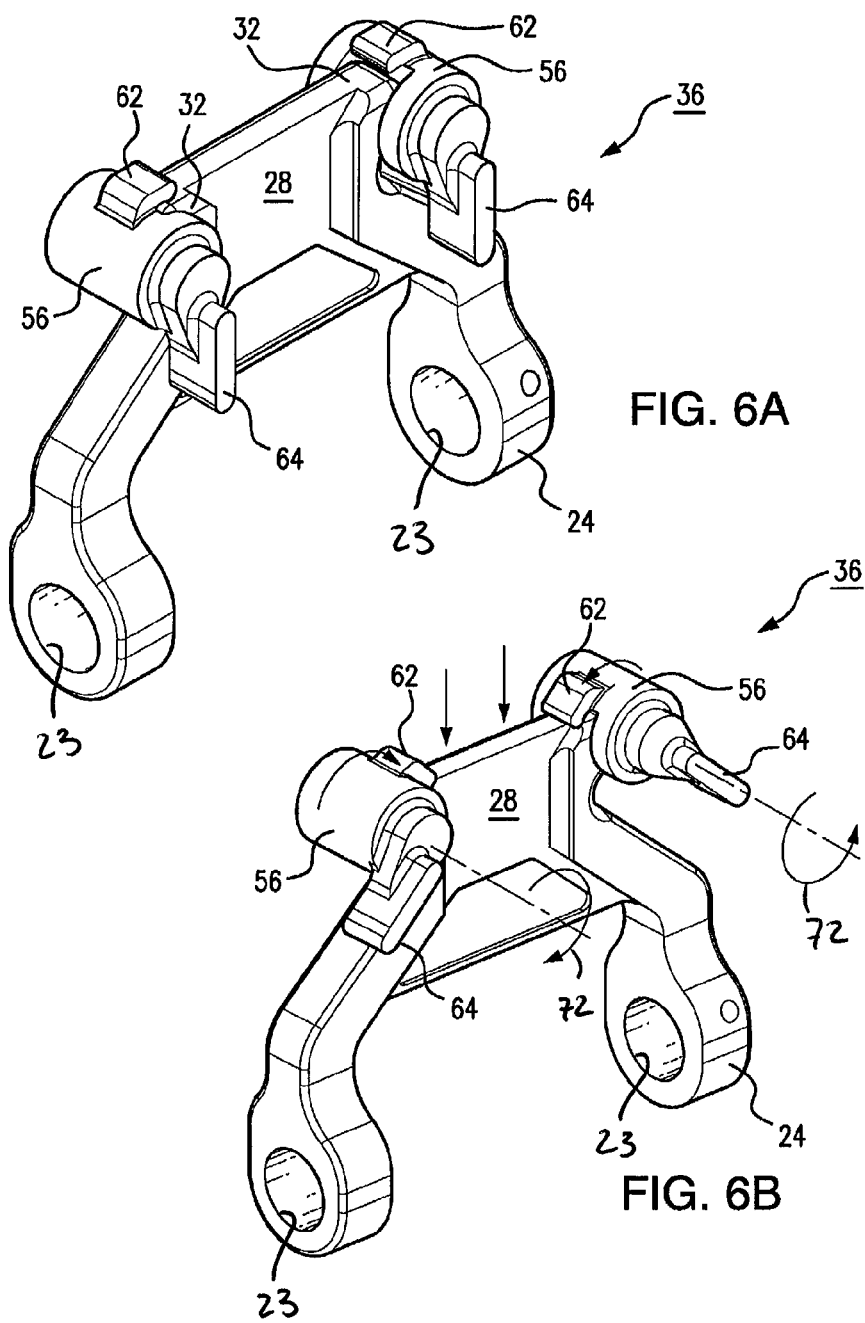
FIG. 6A is a perspective view of an embodiment of a locking mechanism used within the buckle release mechanism shown in FIG. 1 in the locked orientation.
FIG. 6B is a perspective view of the locking mechanism shown in FIG. 6A in the unlocked orientation.

Locking mechanism 36 may further includes a pair of locking pins 56. Each of the locking pins 56 extends between an upper and lower surface of housing 26. Each pin 56 may further include an internal opening 58 (note FIG. 5). A cam 62 may be positioned adjacent each opening 58 and extend from the surface of each pin 56. A wing 64 may integrally formed at the upper end of each locking pin 56. Each of these wings 64 is adapted to be selectively retained within one of the locking lever recesses 52. When the locking levers 46 are in alignment with respect to one another, wings 64 are retained within recesses 52. This orientation is depicted in FIGS. 4A and 6A. However, when locking levers 46 are angled with respect to one another, recesses 52 rotate and clear wings 64 such that wings 64 can rotate outwardly in the direction generally indicated by arrow 72 (see FIG. 6B). This orientation is depicted in FIGS. 4B and 6B. This, in turn, causes the inward rotation of the internal openings 58 and cams 62. As described in more detail hereinafter, this unlocks and ejects striker plate 28 from housing 26. Pivot springs 55 (note FIGS. 4A and 5) may be secured about the pivot points 54 to bias wings 64 to their outward orientation as shown in FIG. 4B. While only one pivot spring 55 is shown in FIGS. 4A and 5, it should be understood by those skilled in the art that each pivot point 54 may be equipped with a respective pivot spring 55. For sake of clarity, pivot springs 55 have been omitted from the locking mechanism shown in FIG. 4B.

In use, with latch 42 pivoted upwardly, slide 38 can be moved toward the rearward end 22 of housing 26. This rearward movement of slide 38 rotates pins 56 such that openings 58 are oriented towards forward opening 34 of housing 26. Striker plate 28 can then be inserted into opening 34 of housing 26. During insertion, lugs 32 are received within the openings 58. Lugs 32 then contact cams 62 to rotate pins 56. Striker 28 may also engage leaf spring 66 thereby compressing the leaf spring to its loaded position wherein the leaf spring stores the unlocking force. When slide 38 is retracted, wings 64 are lockingly received within recesses 52 of levers 46. Striker plate 28 is now lockingly received within buckle 10. In this orientation, locking levers 46 are in alignment with one another. This is the locked orientation illustrated in FIGS. 4A and 6A.

Thereafter, if a user wishes to unlock the buckle mechanism 10, they must again pivot latch 42 upwardly against the bias of latch spring 43. With latch 42 in the pivoted position, slide 38 and be moved toward the rearward end 22 of housing 26. This rearward movement of slide 38 causes a corresponding movement of slide post 44. Slide post 44, in turn, pivots each of the locking levers 46 about the corresponding pivot points 54. As the locking levers 46 rotate, locking arm recesses 52 clear wings 64 such that pivot springs 55 can operate to rotate each of the wings 64 outwardly (with respect to the centerline of the buckle assembly). Because wings 64 are integrally connected to locking pins 56, this rotation causes a similar rotation of the two cams 62. The outward rotation of wings 64 causes the internal openings 58 to rotate inwardly. This inward rotation of the internal openings 58 permits lugs 32 of striker plate 28 to exit the locking mechanism 36. The ejection of striker plate 28 is facilitated by earns 62. Namely, the rotation of locking pins 56 causes cams 62 to contact the outer face of striker plate 28 and urge it to exit aperture 34 in housing 26 (note FIG. 6B). Further, rotation of internal openings 58 and disengagement of lugs 32 therein releases the stored bias within leaf springs 66 thereby urging striker 28 to exit aperture 34. Ultimately, this permits yoke 24 and its associated webbing to be separated from housing 26 even when a load is on yoke 24.

Figure 12:
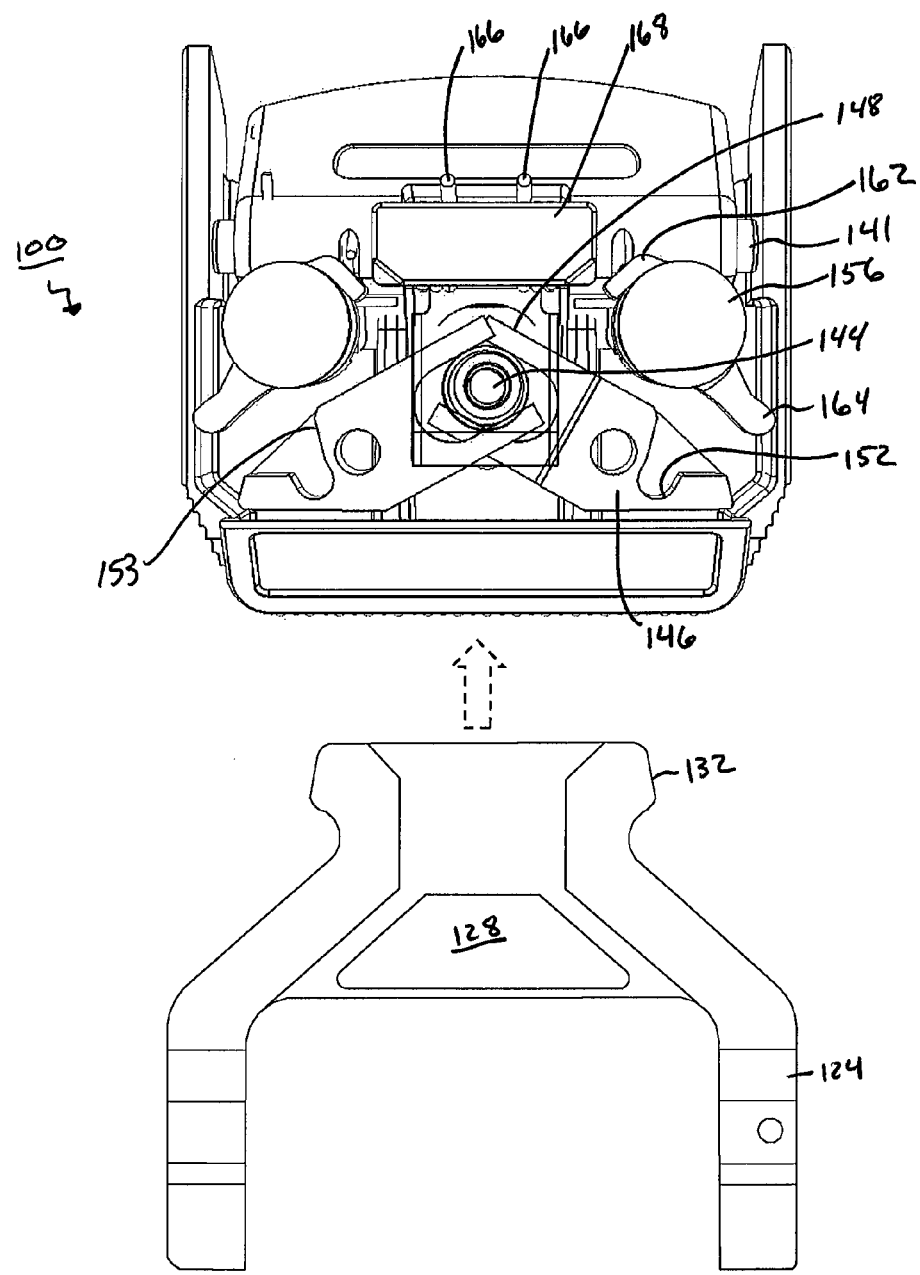
FIG. 12 is a top plan sectional view of the buckle release mechanism of FIG. 8 in the unlocked orientation.

With reference to FIGS. 8-15, an alternative embodiment of a buckle 100 generally includes opposing forward 120 and rearward 122 ends for coupling various types of straps, webbing or belts. In one particular embodiment, buckle 100 forms part of a parachute canopy for a pilot's harness. To achieve this, each end 120, 122 of buckle 100 is adapted to receive a roller (not shown) between opposing apertures 121, 123, respectively, defined within their respective ends. Each length of webbing has an end that is secured about one of these rollers. The forward roller extends between two ends of a removable yoke 124. The rearward roller extends between two sides of a housing 126. Each roller can be secured to the end of a length of a webbing. A striker plate 128 with opposing lugs 132 is formed at the opposite end of yoke 124 (FIG. 12). Striker plate 128 and lugs 132 are adapted to be inserted into an aperture 134 located at forward end 120 of housing 126.

Striker plate 128 is retained in (or ejected from) housing 126 by way of a locking mechanism 136. Locking mechanism 136 is described next in conjunction with FIGS. 10-14. Locking mechanism 136 can be operated by the user via a slide 138 and latch 142. Slide 138 includes downwardly extending sides that are mounted over the sides of housing 126. This interconnects slide 138 to housing 126 and it also allows slide 138 to be slid between the forward and rearward ends (120 and 122, respectively) of housing 126. Slide 138 is prevented from moving towards the rearward end 122 of housing 126 by latch 142 through the interference between latch edge 160 and slide edge 161 of slide 138. Latch 142 further includes a slide tongue 1139 that resides within a notched portion 145 defined by latch 142 to prevent contaminants from entering the locking mechanism 136.

Latch 142 is pivotally coupled to housing 126 via latch pin 141 and has opened and closed positions. When latch 142 is pivoted upwardly in the direction generally indicated by arrow 147 (see FIG. 15), the bottom of the latch 142 rotates downwardly in the direction generally indicated by arrow 165. This action disengages latch edge 160 from slide edge 161, which in turn permits slide 138 to be moved rearwardly; to the rearward end 122 of housing 126. Latch 142 is normally biased to the closed position (note FIG. 15) via one or more latch springs 143 (see FIG. 9), thereby preventing the rearward movement of slide 138. Latch 142 can be pivoted to an opened position by overcoming the spring bias. This two part actuation (i.e., pivoting latch 142 upwardly and moving slide 138 rearwardly) avoids inadvertent release of the mechanism.

Figure 14:
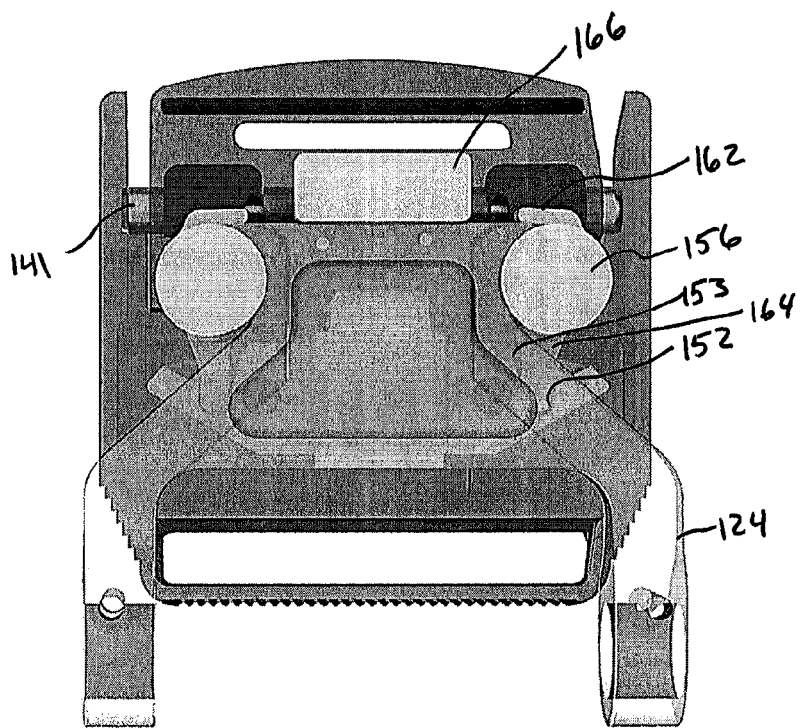
FIG. 14 is a top plan sectional view of the buckle release mechanism of FIG. 8 in the locked orientation.
Figure 15:
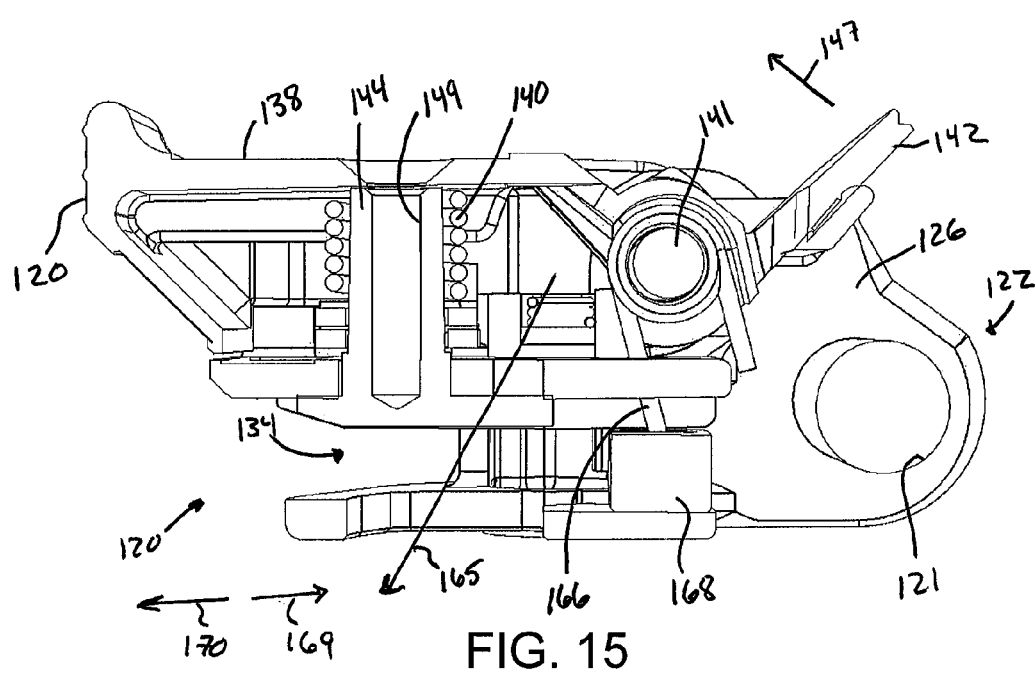
FIG. 15 is a side sectional view of the locking mechanism of FIG. 8 in the uncoupled orientation.

Locking mechanism 136 includes a central slide post 144 that extends through housing 126 and is coupled to slide 138 at a first end (such as, by example, a screw threaded within hole 149 shown in FIG. 15). The opposing end of slide post 144 may include a strike ramp 163 configured to aid sliding engagement of striker 128 into aperture 134. Slide post 144 may also interconnect a pair of locking levers 146. Each of the locking levers 146 may include an inner end 148 that is forked. The forked extent 148 of each locking lever 146 is positioned about slide post 144. The outer extent of each locking lever 146 defines a recess 152. Movement of slide 138 with respect to housing 126 causes a corresponding movement of slide post 144 with respect to housing 126. Movement of slide post 144, in turn, causes each of the locking levers 146 to pivot about a respective pivot point 154. A post spring 140 may be positioned about slide post 44 to urge it into a locked position (note FIG. 9). For sake of clarity, post spring 140 has been omitted from FIGS. 10-14. When slide post 144 is positioned as noted in FIG. 10, locking levers 146 are in alignment with one another. This corresponds to the locked orientation. When slide post 144 is positioned as noted in FIG. 12, locking levers 146 are angled with respect to one another. This corresponds to the unlocked orientation.

Figure 9:
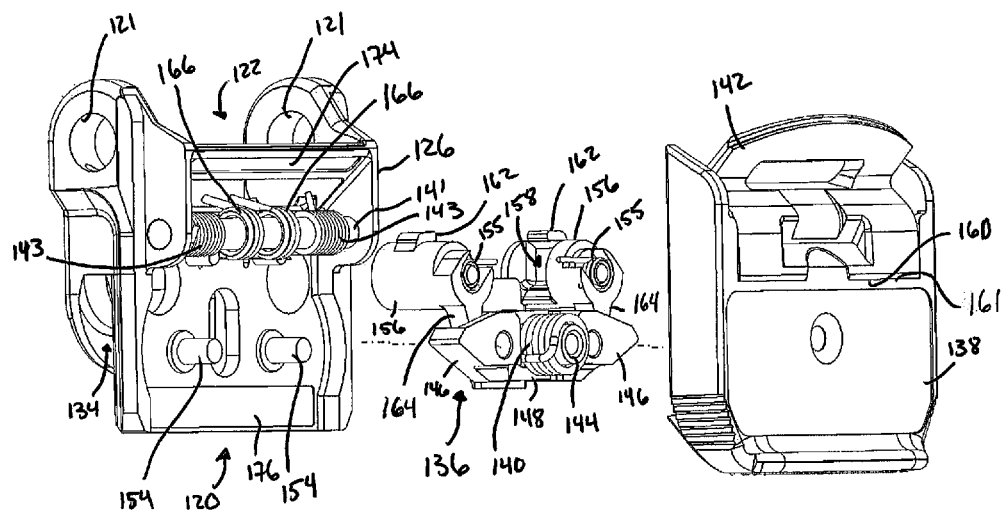
FIG. 9 is an exploded view of the housing of the buckle release mechanism shown in FIG. 8.

As shown most clearly in FIGS. 9 and 15, buckle 100 may further include one or more torsion springs 166 mounted onto latch pin 141. One end of torsion spring 166 may be coupled to an ejector 168, the operation of which will be discussed in further detail below. Striker 128 may be inserted into housing 126 as a user applies a locking force in the direction generally indicated by numeral 169. As striker 128/yoke 124 is inserted into aperture 134 so as to be locked in place by locking levers 146 (as will be discussed in more detail below), torsion springs 166 are biased to a loaded position so as to store an unlocking force which seeks to move striker 128 in the opposing direction 170. The unlocking force is transmitted through striker 128 and is prevented from releasing due to the locking engagement of lugs 132 within cam openings 158 of locking pins 156 as described below.

Figure 10:
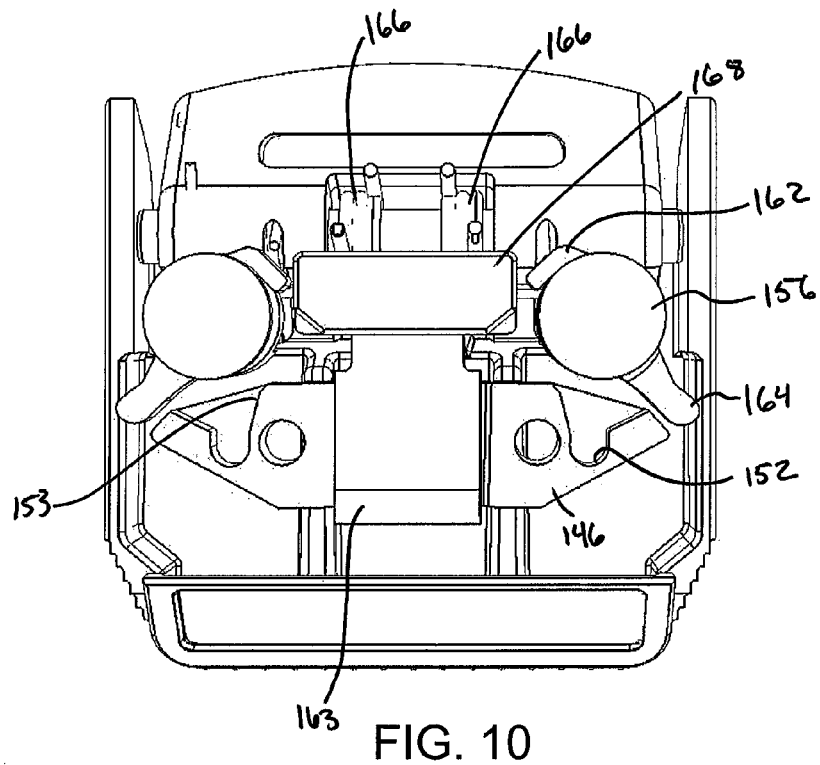
FIG. 10 is a top plan sectional view of the housing of the buckle release mechanism shown in FIG. 8 in the uncoupled orientation.
Figure 11:
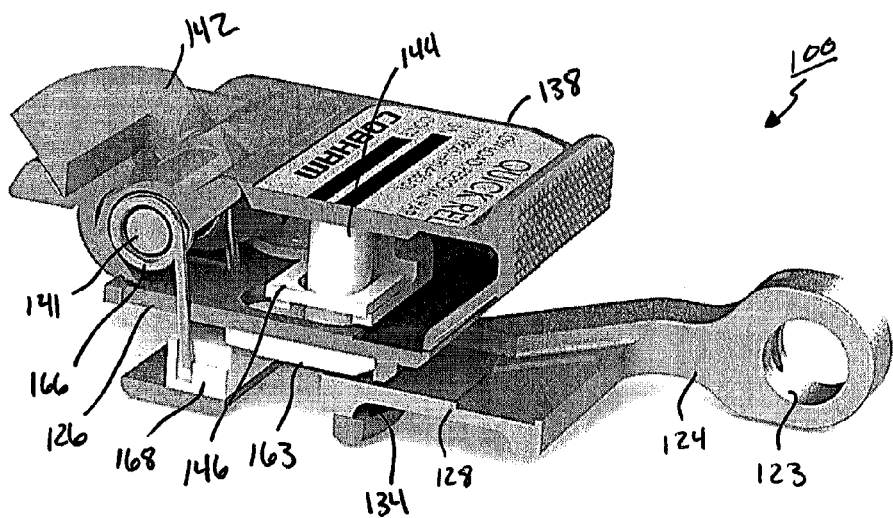
FIG. 11 is a cross sectional view of the buckle release mechanism of FIG. 8 in the uncoupled orientation.
Figure 13:
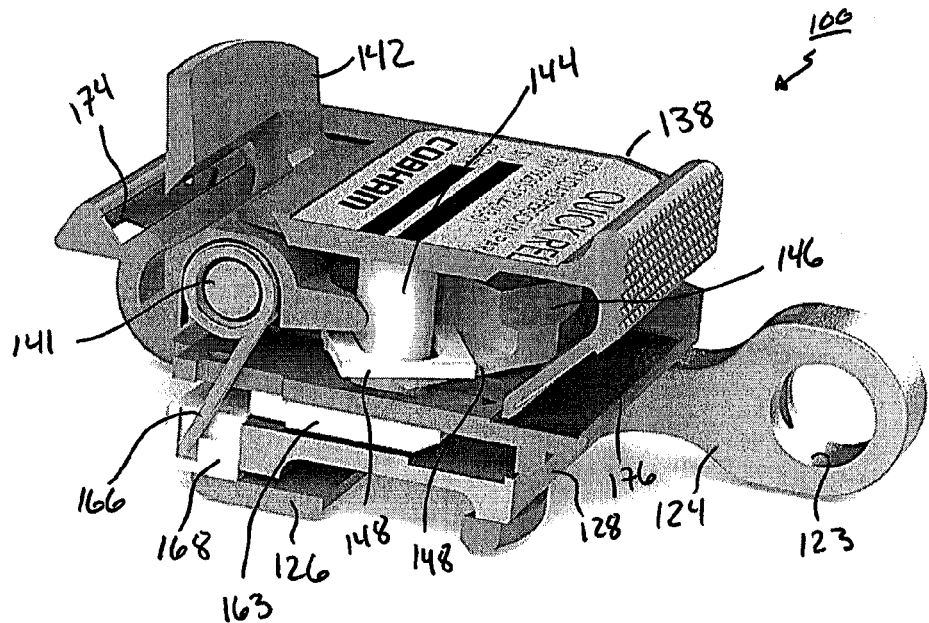
FIG. 13 is a cross sectional view of the buckle release mechanism of FIG. 8 in the coupled and unlocked orientation.

Locking mechanism 136 may further include a pair of locking pins 156. Each of the locking pins 156 extends between an upper and lower surface of housing 126. Each pin 156 may further include an internal opening 158 (note FIG. 9). A cam 162 may be positioned adjacent each opening 158 and extend from the surface of each pin 156. A wing 164 may be integrally formed at the upper end of each locking pin 156. Each of these wings 164 is adapted to be selectively retained within one of the locking lever recesses 152. When the locking levers 146 are in alignment with respect to one another, wings 164 are retained within recesses 152. This locked orientation is depicted in FIGS. 9, 10 and 14. However, when locking levers 146 are angled with respect to one another, recesses 152 rotate and clear wings 164 such that wings 164 can rotate outwardly. This unlocked orientation is depicted in FIGS. 12 and 13. This, in turn, causes the inward rotation of the internal openings 158 and cams 162. As described in more detail hereinafter, this unlocks and ejects striker plate 128 from housing 126. Each locking pin 156 may further include a pivot spring 155 configured to bias the locking pin in the unlocked orientation.

In use, latch 142 is pivoted upwardly in the direction generally indicated by arrow 147 (FIG. 15) so as to allow slide 138 to be moved toward the rearward end 122 of housing 126. This rearward movement of slide 138 rotates pins 156 such that openings 158 are oriented towards forward opening 134 of housing 126 (FIG. 12). Striker plate 128 may then be inserted into opening 134 of housing 126 (FIG. 13). During insertion, lugs 132 are received within the openings 158. Lugs 132 then contact cams 162 to rotate pins 156 such that pins 156 overcome the outwardly directed bias of pivot springs 155. Striker 128 also engages ejector 168 thereby driving ejector 168 rearward toward rearward end 122 of housing 126. The rearward travel of ejector 168 also loads an unlocking bias in 166 as described above. When slide 138 is retracted, i.e. slid toward forward end 120 (FIG. 14), wings 164 are lockingly received within recesses 152 of levers 146 and latch 142 is reset to its locking position by latch springs 143. Striker plate 128 is now lockingly received within buckle 100. In this orientation, locking levers 146 are in alignment with one another. This is the locked orientation illustrated in FIG. 14.

Thereafter, if a user wishes to unlock the buckle mechanism 100, pivot latch 142 is rotated upwardly (i.e. in direction 147) against the bias of latch springs 143. With latch 142 in the pivoted position, slide 138 may be moved toward the rearward end 122 of housing 126. The rearward movement of slide 138 causes a corresponding movement of slide post 144. Slide post 144, in turn, pivots each of the locking levers 146 about the corresponding pivot points 154. As the locking levers 146 rotate, locking arm recesses 152 clear wings 164 such that pivot springs 155 can operate to rotate each of the wings 164 outwardly (with respect to the centerline of the buckle assembly). Because wings 164 are integrally connected to locking pins 156, this rotation causes a similar rotation of the two cams 162. The outward rotation of wings 164 causes the internal openings 158 to rotate inwardly. This inward rotation of the internal openings 158 permits lugs 132 of striker plate 128 to exit the locking mechanism 136. Should locking pins 156 fail to initially rotate upon biasing of pivot springs 155, each locking lever 146 may be further configured to include a kick-out portion 153 which is proportioned to engage with wing 164 to urge the locking pins 156 to rotate. The ejection of striker plate 128 may be facilitated by cams 162. Namely, the rotation of locking pins 156 causes cams 162 to contact the outer face of striker plate 128 and urge the striker plate 128 to exit aperture 134 in housing 126. Further, rotation of internal openings 158 and disengagement of lugs 132 therein releases the stored bias within torsion springs 166 such that ejector 168 urges striker plate 128 to exit aperture 134. Ultimately, this permits yoke 124 and its associated webbing to be separated from housing 126 even when a load is on yoke 124.

In a further aspect of the present invention, buckle 100 may further include locking indicators configured to communicate to a user whether the striker plate 128 has been properly secured within housing 126. By way of example, housing 126 may be configured to include one or more indicator surfaces, such as latch indicator surface 174 and slide indicator surface 176, which may signal to the user the status of buckle 100 (see FIGS. 9 and 13). That is, latch indicator surface 174 and slide indicator surface 176 may be of a different color than the remainder of buckle 100. For example, and by no means meant to be limited solely thereto, indicator surfaces 174, 176 may be a bright color, a neon color, and/or include reflectors such that these surfaces readily stand out against the other surfaces of buckle 100 and any restraints coupled thereto. In use, as latch 142 is rotated upwardly and slide 138 is moved rearwardly as described above, indicator surfaces 174, 176 may become visible to the user. Once striker plate 128 has been inserted into aperture 134, proper forward movement of slide 138 will cause slide 138 to occlude slide indicator surface 176 thereby signaling to the user that the slide is in the proper position. Likewise, latch 142 will return to its locked position, such as through action of latch springs 141, and thereby occlude latch indicator surface 174. Proper latching of the buckle occurs only when both indicator surfaces are blocked from view. If one or both surfaces may be seen by the user, the buckle is not securely fastened and inadvertent or untimely unbuckling may result should a sufficient opposing force be applied to housing 126 and striker plate 128.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A buckle mechanism comprising:
 a housing with forward and rearward ends, an opening formed within the forward end of the housing;
 a slide secured over the housing and adapted for movement between locked and unlocked positions;
 a pair of locking pins rotatably positioned within the housing, each of the pins including an internal opening and a cam positioned adjacent the internal opening, each pin having locked and unlocked orientations, with movement of the slide in a first direction bringing the pins into the unlocked orientation and movement of the slide in an opposing second direction bringing the pins into the locked orientation; and
 a striker plate with opposing lugs, the lugs being lockingly received within the internal openings with the pins in the locked orientation, and with the lugs being ejected from the internal openings by engagement of the cams with the striker plate when the pins are rotated to the unlocked orientation.

2. The buckle of claim 1 further comprising an ejector coupled to the housing, the ejector biased to a loaded position when the lugs are lockingly received within the internal openings with the pins in the locked orientation, and with the ejector being unbiased to an unloaded position thereby ejecting the lugs from the internal openings when the pins are rotated to the unlocked orientation.

3. The buckle of claim 2 wherein the ejector is a leaf spring.

4. The buckle of claim 2 wherein the ejector is an ejector block coupled to a torsion spring.

5. A buckle mechanism comprising:
a housing with forward and rearward ends, an opening formed within the forward end of the housing;
a slide secured to the housing and adapted for linear movement between locked and unlocked positions, a slide post secured to the slide and adapted for movement with the slide between the locked and unlocked positions;
a pair of locking levers positioned within the housing, each locking lever having a first end, a second recessed end, and a pivot point therebetween, each of the first ends being interconnected to the slide post, whereby movement of the slide and slide post to the unlocked position causes each of the locking levers to pivot about its respective pivot point;
a pair of locking pins rotatably positioned within the housing, each of the pins including an internal opening and a wing, the pins having locked and unlocked orientations corresponding to the locked and unlocked positions of the slide post, the wings being positioned within the recessed ends of the locking levers with the pins in the locked position, the wings being ejected from the recessed ends of the locking levers with the pins in the unlocked position; and
a striker plate with opposing lugs, the lugs being retained within the internal openings of the locking pins with the slide and slide post in the locked position.

6. The buckle mechanism as described in claim 5 further comprising a latch pivotally secured to the housing and having opened and closed positions, wherein the latch must be in the opened position in order for the slide to be moved to the unlocked position.

7. The buckle of claim 6 wherein the housing includes one or more indicator surfaces configured to communicate to a user whether the striker plate has been properly secured within the housing.

8. The buckle of claim 7 wherein the housing includes a latch indicator surface and a slide indicator surface wherein the slide indicator surface is occluded by the slide when the slide is in the locked position and wherein the latch indicator surface is occluded by the latch when the latch is in the closed position.

9. The buckle mechanism as described in claim 5 wherein the first end of each locking lever is forked and wherein the adjacent forks are positioned about the slide post.

10. The buckle mechanism as described in claim 5 further comprising a cam adjacent the internal opening of each pin, wherein by moving the slide and slide post into the unlocked position, the pins rotate such that the lugs are ejected from the housing by way of the cams.

11. The buckle mechanism as described in claim 5 wherein the striker plate includes a yoke that is interconnected to the restraint.

12. The buckle of claim 5 further comprising an ejector coupled to the housing, the ejector biased to a loaded position when the lugs are lockingly received within the internal openings with the pins in the locked orientation, and with the ejector being unbiased to an unloaded position thereby ejecting the lugs from the internal openings when the pins are rotated to the unlocked orientation.

13. The buckle of claim 12 wherein the ejector is a leaf spring.

14. The buckle of claim 12 wherein the ejector is an ejector block coupled to a torsion spring.

15. The buckle mechanism as described in claim 5 wherein each locking lever includes a kick-out portion configured to engage the wing to urge the locking pin to rotate to the unlocked orientation when the slide and slide post are moved to the unlocked position.

16. The buckle mechanism as described in claim 5 further comprising a respective pivot spring coupled to each locking pin, the pivot spring configured to bias the locking pin in the unlocked orientation.

17. A buckle mechanism for selectively securing a restraint, the buckle mechanism comprising:
a housing with forward and rearward ends, an opening formed within the forward end of the housing;
a slide secured to the housing and adapted for linear movement between locked and unlocked positions;
a latch pivotally secured to the housing and having opened and closed positions, wherein the latch must be in the opened position in order for the slide to be moved to the unlocked position;
a slide post secured to the slide and adapted for movement with the slide between the locked and unlocked positions;
a pair of locking levers positioned within the housing, each locking lever having a first forked end, a second recessed end, and a pivot point therebetween, each of the forked ends being positioned about the slide post, whereby movement of the slide and slide post to the unlocked position causes each of the locking levers to pivot about its respective pivot point;
a pair of locking pins rotatably positioned within the housing, each of the pins including an internal opening, a cam adjacent the internal opening, and a wing, the pins having locked and unlocked orientations corresponding to the locked and unlocked positions of the slide post, the wings being positioned within the recessed ends of the locking levers with the pins in the locked position, the wings being ejected from the recessed ends of the locking levers with the pins in the unlocked position;
a yoke having a striker plate with opposing lugs, the yoke being interconnected to the restraint, the lugs being retained within the internal openings of the locking pins with the slide and slide post in the locked position, and wherein by moving the slide and slide post into the unlocked position, the pins rotate such that the lugs are ejected from the housing by way of the cams.

* * * * *